United States Patent
Liu et al.

(10) Patent No.: US 12,490,623 B2
(45) Date of Patent: Dec. 2, 2025

(54) DISPLAY PANEL AND DISPLAY DEVICE INCLUDING A CATHODE LAYER HAVING A PLURALITY OF CATHODE UNITS

(71) Applicant: WUHAN CHINA STAR OPTOELECTRONICS SEMICONDUCTOR DISPLAY TECHNOLOGY CO., LTD., Hubei (CN)

(72) Inventors: Na Liu, Hubei (CN); Wenxu Xianyu, Hubei (CN); Chunpeng Zhang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/759,808

(22) PCT Filed: Jul. 13, 2022

(86) PCT No.: PCT/CN2022/105348
§ 371 (c)(1),
(2) Date: Jul. 29, 2022

(87) PCT Pub. No.: WO2024/000655
PCT Pub. Date: Jan. 4, 2024

(65) Prior Publication Data
US 2024/0188371 A1    Jun. 6, 2024

(30) Foreign Application Priority Data
Jun. 28, 2022  (CN) .......................... 202210750868.8

(51) Int. Cl.
*H10K 59/40* (2023.01)
*G06F 3/041* (2006.01)
(Continued)

(52) U.S. Cl.
CPC ........... *H10K 59/40* (2023.02); *G06F 3/0412* (2013.01); *G06F 3/0443* (2019.05);
(Continued)

(58) Field of Classification Search
CPC .... H10K 59/40; H10K 59/122; H10K 59/124; H10K 59/80521; G06F 3/0412;
(Continued)

(56) References Cited

U.S. PATENT DOCUMENTS 11,068,090 B2 * 7/2021 Wang .................. G02B 5/3058
2014/0346459 A1  11/2014 Song et al.
(Continued)

FOREIGN PATENT DOCUMENTS

| CN | 104820532 A | 8/2015 |
| CN | 106773221 A | 5/2017 |

(Continued)

OTHER PUBLICATIONS

International Search Report in International application No. PCT/CN2022/105348, mailed on Jan. 3, 2023.
(Continued)

*Primary Examiner* — Khiem D Nguyen
(74) *Attorney, Agent, or Firm* — PV IP PC; Christopher S. Ruprecht; Wei Te Chung

(57) ABSTRACT

Provided is a display panel, which comprises an anode layer, a light-emitting functional layer, and a cathode layer, wherein the light-emitting functional layer is disposed on the anode layer and the cathode layer is disposed on the light-emitting functional layer and comprises a plurality of cathode units. Each of the cathode units comprises a first
(Continued)

electrode and a second electrode that are insulated from each other, wherein the second electrode is disposed at a periphery of the first electrode.

20 Claims, 2 Drawing Sheets

(51) Int. Cl.
*G06F 3/044* (2006.01)
*H10K 59/122* (2023.01)
*H10K 59/124* (2023.01)
*H10K 59/80* (2023.01)

(52) U.S. Cl.
CPC ......... *G06F 3/0446* (2019.05); *H10K 59/122* (2023.02); *H10K 59/124* (2023.02); *H10K 59/80521* (2023.02); *G06F 2203/04107* (2013.01)

(58) Field of Classification Search
CPC .. G06F 3/0443; G06F 3/0446; G06F 3/04164; G06F 2203/04107; G06F 2203/04111; G06F 2203/04112
See application file for complete search history.

(56) References Cited

U.S. PATENT DOCUMENTS

| | | | |
|---|---|---|---|
| 2016/0211310 A1 | 7/2016 | Wang et al. | |
| 2019/0157355 A1* | 5/2019 | Ye | H10K 59/80521 |
| 2021/0048925 A1* | 2/2021 | Wang | G06F 3/0446 |
| 2021/0305353 A1* | 9/2021 | Ono | G09G 3/3266 |
| 2021/0305354 A1* | 9/2021 | Son | H10K 71/00 |
| 2021/0399083 A1* | 12/2021 | Kang | G06F 3/0443 |
| 2022/0013607 A1* | 1/2022 | Lee | H10K 59/875 |

FOREIGN PATENT DOCUMENTS

| | | |
|---|---|---|
| CN | 107394057 A | 11/2017 |
| CN | 107885400 A | 4/2018 |
| CN | 107992225 A | 5/2018 |
| CN | 110471568 A | 11/2019 |
| CN | 111341937 A | 6/2020 |
| CN | 111625130 A | 9/2020 |
| CN | 111785742 A | 10/2020 |
| CN | 113488514 A | 10/2021 |
| CN | 114115571 A | 3/2022 |
| CN | 114461087 A | 5/2022 |
| WO | 2019100478 A1 | 5/2019 |

OTHER PUBLICATIONS

Written Opinion of the International Search Authority in International application No. PCT/CN2022/105348, mailed on Jan. 3, 2023.
Chinese Office Action issued in corresponding Chinese Patent Application No. 202210750868.8 dated Feb. 28, 2025, pp. 1-9.

* cited by examiner

DISPLAY PANEL AND DISPLAY DEVICE INCLUDING A CATHODE LAYER HAVING A PLURALITY OF CATHODE UNITS

TECHNICAL FIELD

The present application relates to a technical field of display, and in particular, to a display panel a display device.

BACKGROUND

With development of portable electronic display devices, touch technology is increasingly indispensable as an interface for human-computer interaction. Currently, commonly used touch technologies include an out-cell touch technology and a in-cell touch technology. The in-cell touch technology can make the display device lighter and thinner than the out-cell touch technology, and therefore more attention has been paid to that application of the in-cell touch technology in organic light-emitting diode (OLED).

A relatively mature in-cell touch technology adds a thin film layer and a process flow based on a display panel technology, thereby causing a complex structure and increasing manufacturing costs.

Technical Problem

It is an object of the present application to provide a display panel and a display device, which are intended to simplify structure of a touch display panel and to save costs.

Technical Solution

In one aspect, the present application provides a display panel, wherein the display panel comprises at least:
  an anode layer;
  a light-emitting functional layer disposed on the anode layer; and
  a cathode layer disposed on the light-emitting functional layer, wherein the cathode layer comprises a plurality of cathode units, each of the cathode units comprises a first electrode and a second electrode that are insulated from each other, and the second electrode is disposed at a periphery of the first electrode in a top view structure.

In some embodiments, the display panel further comprises:
  an array substrate comprising a source and a drain; and
  a metal layer disposed between the array substrate and the anode layer;
  wherein the metal layer comprises a touch driving signal metal layer and a connecting metal layer arranged at intervals, wherein the touch driving signal metal layer is electrically connected to the first electrode; and the connecting metal layer connects the anode and the drain.

In some embodiments, the plurality of cathode units are distributed in a plurality of rows, the cathode units in two adjacent rows are staggered, and the second electrodes in a same row are connected to each other.

In some embodiments, a plurality of rows of the first electrodes comprise connecting row electrodes and virtual row electrodes that are alternately arranged, the connecting row electrodes comprise at least one first sub-electrode and a plurality of second sub-electrodes, the first sub-electrode is electrically connected to the touch driving signal metal layer; and the virtual row electrodes comprise a plurality of the second sub-electrodes.

In some embodiments, the connecting row electrodes comprise a plurality of the first sub-electrodes, and the plurality of the first sub-electrodes and the plurality of second sub-electrodes are alternately arranged in a row of the connecting row electrode.

In some embodiments, among the connecting row electrodes of different rows, the first sub-electrodes are distributed in columns, and the touch driving signal metal layer extends along a column direction of the first sub-electrodes.

In some embodiments, the first sub-electrode in the connecting row electrode and the second electrode in the same row form a touch electrode.

In some embodiments, the first sub-electrode in the connecting row electrode and the second electrode in the adjacent virtual row electrode form a touch electrode.

In some embodiments, the display panel further comprises:
  a planarization layer disposed between the array substrate and the anode layer and covering the metal layer;
  a pixel definition layer disposed on the planarization layer, wherein the anode layer and the light-emitting functional layer are disposed in the pixel definition layer;
  a common electrode layer disposed between the cathode layer and the pixel definition layer;
  wherein the planarization layer and the pixel definition layer are respectively formed with a first opening and a second opening in communication at positions corresponding to the touch driving signal metal layer, and the first electrode is connected to the touch driving signal metal layer at a bottom of the first opening.

In some embodiments, the display panel further comprises:
  a passivation layer disposed between the pixel defining layer and the planarization layer, wherein the passivation layer is formed with a third opening communicating the first opening and the second opening;
  wherein the bottom of the first opening comprises a first bottom exposed to the second opening and the third opening, and a second bottom shielded by the passivation layer and the pixel definition layer, the common electrode layer covers the first bottom, and the first electrode covers the common electrode layer and the second bottom In another aspect, the present application provides a display device, wherein the display device comprises at least a display panel according to any one of the above-described embodiments.

Technical Effects

The present application provides a display panel and a display device comprising an anode layer, a light-emitting functional layer and a cathode layer, wherein the light-emitting functional layer is disposed on the anode layer, and the cathode layer is located on the light-emitting functional layer and comprises a plurality of cathode units. Each of the cathode units comprises a first electrode and a second electrode that are insulated from each other, wherein the second electrode is disposed at a periphery of the first electrode. In the present application, a cathode layer is divided into a plurality of cathode units, and a first electrode in the cathode units may be used as a touch driving electrode, and a second electrode may be used as a touch sensing electrode, so that the first electrode and the second electrode insulated from each other may form a mutual-capacitive in-cell touch electrode. Therefore, the cathode layer is not only used as an electrode of the light-emitting functional layer, but also can form a touch electrode—that is, in the present application, a touch electrode can be formed by using the cathode layer without adding other film layers. Therefore, structure of the in-cell touch display panel can be simplified and the cost can be saved.

BRIEF DESCRIPTION OF THE DRAWINGS

The technical solutions and other beneficial effects of the present application will be apparent from detailed description of specific embodiments of the present application with reference to the accompanying drawings.

DETAILED DESCRIPTION

Hereinafter, technical solution in embodiments of the present application will be clearly and completely described with reference to the accompanying drawings in embodiments of the present application. Apparently, the described embodiments are part of, but not all of, the embodiments of the present application. All the other embodiments, obtained by a person with ordinary skill in the art on the basis of the embodiments in the present application without expenditure of creative labor, belong to the protection scope of the present application.

In description of the present application, it should be understood that the terms "first", "second" are used for descriptive purposes only and cannot be understood as indicating or implying relative importance or implicitly indicating the number of indicated technical features. Thus, the features defined by "first" and "second" may explicitly or implicitly include one or more features. In description of the present application, "a plurality of" means two or more, unless specifically limited otherwise.

In the present application, unless specified and limited otherwise, a first feature "on" or "under" a second feature may include direct contact of the first feature and the second feature, and it may also be included that the first feature and the second feature are not in direct contact but are contacted by additional features between them. Moreover, the first feature "on", "above" and "upper" the second feature includes the first feature directly above and obliquely upward the second feature, or merely indicates that a level of the first feature is higher than a level of the second feature. The first feature "lower", "below" and "under" the second feature includes the first feature directly below and obliquely downward the second feature, or merely indicates that a level of the first feature is less than a level of the second feature.

The following disclosure provides many different embodiments or examples for realizing different structures of the present application. In order to simplify the disclosure of the present application, components and settings of specific examples are described below. Of course, they are merely examples and are not intended to limit the present application. In addition, reference numbers and/or letters may be repeated in different examples of the present application. Such repetitions are for simplification and clearness, which per se do not indicate the relations of the discussed embodiments and/or settings. Moreover, the present application provides examples of various specific processes and materials, but the applicability of other processes and/or application of other materials may be appreciated by a person skilled in the art.

Figure 1:
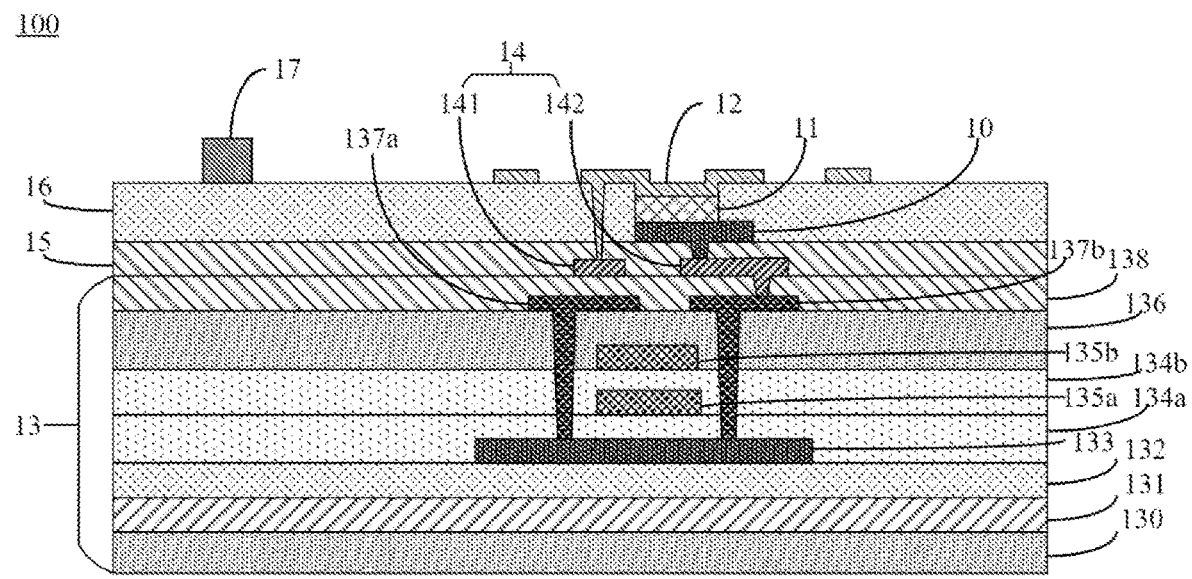
FIG. 1 is a schematic structural diagram of a display panel according to an embodiment of the present application.
Figure 2:
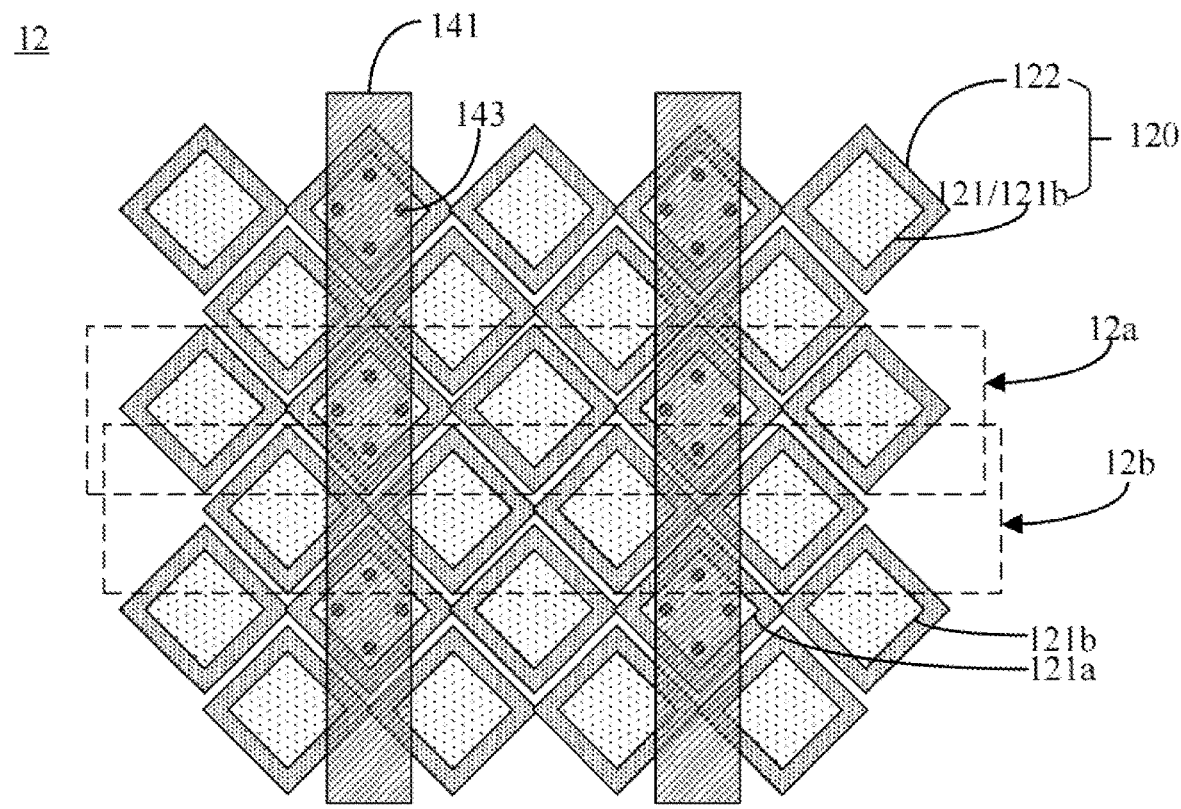
FIG. 2 is a schematic top structural diagram of a cathode layer according to an embodiment of the present application.

Referring to FIG. 1, which is a schematic structural diagram of a display panel according to an embodiment of the present application. The display panel can be applied to a in-cell touch organic light-emitting diode (OLED). Referring also to FIG. 2, which is a schematic top structural diagram of a cathode layer according to an embodiment of the present application.

The display panel 100 comprises at least an anode layer 10, a light-emitting functional layer 11, and a cathode layer 12, wherein the light-emitting functional layer 11 is disposed on the anode layer 10, and the cathode layer 12 is disposed on the light-emitting functional layer 11 and comprises a plurality of cathode units 120. Each of the cathode units 120 comprises a first electrode 121 and a second electrode 122 that are insulated from each other, and the second electrode 122 is disposed at a periphery of the first electrode 121 in a top view structure.

A structure of the anode layer 10 comprises, but is not limited to, a laminated structure of oxidized ITO/Ag/ITO or a single-layer ITO structure. A structure of the light-emitting functional layer 11 may comprise a hole injection layer, a hole transport layer, a light-emitting layer, an electron transport layer, and an electron injection layer. A material of the cathode layer 12 may be one or more of Mg, Ag and IZO.

In some embodiments, as shown in FIG. 1, the display panel 100 may further comprise an array substrate 13 and a metal layer 14 disposed between the array substrate 13 and the anode layer 10. The array substrate 13 may comprise, from bottom to top, a substrate 130, a barrier layer 131, a buffer layer 132, an active layer 133, a first gate insulating layer 134a, a first gate 135a, a second gate insulating layer 134b, a second gate 135b, an interlayer dielectric layer 136, a source 137a and a drain 137b, and a first planarization layer 138. The active layer 133 is disposed on the buffer layer 132, and the first gate insulating layer 134a is disposed on the buffer layer 132 and covers the active layer 133. A first gate 135a is disposed on the first gate insulating layer 134a, and a second gate insulating layer 134b is disposed on the first gate insulating layer 134a and covers the first gate 135a. A second gate 135b is disposed on the second gate insulating layer 134b, and an interlayer dielectric layer 136 is disposed on the second gate insulating layer 134b and covers the second gate 135b. The source electrode 137a and the drain electrode 137b are disposed on the interlayer dielectric layer 136 and are connected to both sides of the active layer 133 through vias. The first planarization layer 138 is disposed on the interlayer dielectric layer 136 and covers the source 137a and the drain 137b.

The substrate may comprise one of a rigid substrate (e.g., glass) and a flexible substrate (e.g., polyimide, polyethylene terephthalate, etc.) or a combination thereof. The barrier layer 131 may be an organic insulating material such as polyimide or epoxy, or may be an inorganic insulating material such as SiNx or SiOx. The buffer layer 132 may be a monolayer structure prepared from one of SiOx, SiNx, and SiNO, or a laminated structure prepared from SiNx/SiOx. The active layer 133 may be prepared from an indium gallium zinc oxide or a low-temperature polysilicon, or may be prepared from any other material that may be used as an active layer. Materials of the first gate insulating layer 134a and the second gate insulating layer 134b may be SiOx, SiNx, Al$_2$O$_3$/SiNx/SiOx, SiOx/SiNx/SiOx, etc. Materials of the first gate 135a and the second gate 135b may be Mo or Mo/Al or Mo/Cu or Mo/Cu/IZO or IZO/Cu/IZO or Mo/Cu/ITO or Ni/Cu/Ni or MoTiNi/Cu/MoTiNi or NiCr/Cu/NiCr or CuNb, etc. The interlayer dielectric layer 136 may be prepared from an inorganic material, which is one of SiOx, SiNx, and SiNO. Materials of the source 137a and the drain 137b may be Mo or Al/Mo or Mo/Al/Mo or Mo/Cu or Mo/Cu/IZO or IZO/Cu/IZO or Mo/Cu/ITO or Ni/Cu/Ni or MoTiNi/Cu/MoTiNi or NiCr/Cu/NiCr or CuNb, etc. A material of the first planarization layer 138 may be an organic material.

In some embodiments, the metal layer 14 is disposed on the array substrate 13 (or the first planarization layer 138) and comprises a touch driving signal metal layer 141 and a connecting metal layer 142 arranged at intervals. The display panel 100 may also comprise a second planarization layer 15, and the second planarization layer 15 is disposed on the array substrate 13 (or the first planarization layer 138) and covers the metal layer 14. The anode layer 10 is disposed on the second planarization layer 15 and is connected to the connecting metal layer 142 through a via, and the connecting metal layer 142 is connected to the drain 137b through a via, so that the connecting metal layer 142 can connect the anode layer 10 and the drain 137b. A material of the metal layer 14 may be a variety of metals or metal oxides with good conductivity, and a material of the second planarization layer 15 may be an organic material.

In some embodiments, the anode layer 10 may also be connected to the drain 137b directly through a via.

In some embodiments, the display panel 100 may further comprise a pixel definition layer 16 in which the anode layer 10 and the light-emitting functional layer 11 are formed, and a patterned cathode layer 12 is located above the light-emitting functional layer 11 and the pixel definition layer 16. The touch driving signal metal layer 141 is electrically connected to the first electrode 121 in the cathode layer 12, and a specific connection manner thereof is described below. A material of the pixel defining layer 16 may be an organic material.

In some embodiments, the display panel 100 may also comprise spacers 17 on the pixel definition layer 16.

As shown in FIG. 2, the cathode layer 12 is divided into a plurality of cathode units 120, and the cathode units 120 can be formed by laser etching, wet etching, or fine metal mask (FMM). A top view shape of the cathode unit 120 may be circular, square, or diamond. The plurality of cathode units 120 are distributed in a plurality of rows, and only six rows of the cathode units 120 are shown. The plurality of cathode units 120 are distributed in a plurality of rows, indicating that a plurality of first electrodes 121 are distributed in a plurality of rows, and a plurality of second electrodes 122 are distributed in a plurality of rows corresponding to the first electrodes 121.

In some embodiments, the cathode units 120 in two adjacent rows are staggered, e.g., the cathode units 120 in the second row are offset to the right by a distance such that the cathode units 120 in the second row are located between the two cathode units 120 in the first row, so as to save space. The cathode units 120 in the third and fifth rows may be aligned with the cathode units 120 in the first row, and the cathode units 120 in the fourth and sixth rows may be aligned with the cathode units 120 in the second row. Since the second electrode 122 is disposed around the first electrode 121, the plurality of first electrodes 121 are separated independently in space. A plurality of second electrodes 122 in the same row may be connected to each other.

In some embodiments, a plurality of rows of the first electrodes 121 may comprise connecting row electrodes 12a and virtual row electrodes 12b that are alternately arranged—that is, there is a row of virtual row electrodes 12b between two adjacent rows of connecting row electrodes 12a, or there is a row of connecting row electrodes 12a between two adjacent rows of virtual row electrodes 12b. At least one first electrode 121 in the connecting row electrodes 12a is electrically connected to the touch driving signal metal layer 141 to receive touch driving signals of the touch driving signal metal layer 141 and serve as a touch driving electrode. That is, the first electrode 121 in the connecting row electrode 12a may be all electrically connected to the touch driving signal metal layer 141, or may be partially electrically connected to the touch driving signal metal layer 141. None of the first electrodes 121 in the virtual row electrodes 12b is electrically connected to the touch driving signal metal layer 141.

In one embodiment, the first electrode 121 electrically connected to the touch driving signal metal layer 141 may be referred to as a first sub-electrode 121a, and the first electrode 121 not electrically connected to the touch driving signal metal layer 141 may be referred to as a second sub-electrode 121b. When all the first electrodes 121 in the connecting row electrode 12a are electrically connected to the touch driving signal metal layer 141 through vias, the connecting row electrode 12a comprise only the first sub-electrodes 121a. When a part of the first electrodes 121 in the connecting row electrode 12a are electrically connected to the touch driving signal metal layer 141 through vias, the connecting row electrode 12a comprise at least one first sub-electrode 121a and at least one second sub-electrode 121b—that is, a row of connecting row electrode 12a may have one first sub-electrode 121a or a plurality of first sub-electrodes 121a. Since none of the first electrodes 121 in the virtual row electrode 12b is electrically connected to the touch driving signal metal layer 141, the virtual row electrode 12b may comprise a plurality of the second sub-electrodes 121b—that is, the electrodes included in the virtual row electrode 12b are all second sub-electrodes 121b.

As shown in FIG. 2, when the connecting row electrodes comprise a plurality of first sub-electrodes 121a and a plurality of second sub-electrodes 121b, the first sub-electrodes 121a and the second sub-electrodes 121b may be alternately arranged in a row of the connecting row electrode 12a—that is, the first sub-electrodes 121a are arranged adjacent to the second sub-electrodes 121b, or there is a second sub-electrode 121b between two adjacent first sub-electrodes 121a.

Here, among the connecting row electrodes 12a of different rows, the first sub-electrodes 121a are distributed in columns, i.e., aligned in a column direction. It can be understood that a direction of the column (column direction) is perpendicular to a direction of the row (row direction). The touch driving signal metal layer 141 extends along the column direction to connect the first sub-electrodes 121a of different rows. As shown in FIG. 2, the first sub-electrodes 121a may be connected to the lower touch driving signal metal layer 141 through vias 143, and connection of one first sub-electrode 121a to the touch driving signal metal layer 141 can be ensured through four vias 143.

It should be noted that since the touch driving signal metal layer 141 is located below the cathode layer 12, the touch driving signal metal layer 141 is not visible in the top view, and the touch driving signal metal layer 141 in FIG. 2 is just schematic for illustrating position of the touch driving signal metal layer 141.

It can be understood that the first electrodes 121 in both the connecting row electrode 12a and the virtual row electrode 12b can be used as an electrode of the light-emitting functional layer 11, and the anode layer 10 may be used as another electrode of the light-emitting functional layer 11. When the display panel 100 is in a light-emitting phase, the first electrode 121 receives an image signal, forms an electric field with the anode layer 10, and drives the light-emitting functional layer 11 to emit light. When the display panel 100 is in a touch phase, the first sub-electrode 121a in the first electrode 121 serves as a touch driving electrode, and the second electrode 122 serves as a touch sensing electrode to sense changes in the capacitance value, thereby determining positions of touch points. Specifically, the second electrode 122 is connected to a peripheral touch lead, which is disposed in the same layer as the second electrode 122 and extends to a non-display area to be connected to a flexible circuit board. The first sub-electrode 121a receives touch driving signals, and a coupling capacitance is generated between the first sub-electrode 121a and the second electrode 122, and the coupling capacitance decreases when a finger touches, so that amounts of charge (sensing signal) received by the second electrode 122 changes, and the sensing signal is transmitted to the flexible circuit board through the touch lead, and the flexible circuit board obtains position where the finger has touched according to the sensing signals.

In some embodiments, the first sub-electrode 121a in the connecting row electrode 12a and the second electrode 122 in the same row form a touch electrode. That is, the first sub-electrode 121a and the second electrode 122 surrounding it form a touch electrode, wherein the first sub-electrode 121a serves as a touch driving electrode and the second electrode 122 surrounding it serves as a touch sensing electrode.

In some embodiments, the first sub-electrode 121a in the connecting row electrode 12a and the second electrode 122 in the adjacent virtual row electrode 12b form a touch electrode. That is, the first sub-electrode 121a serves as a touch driving electrode, and the second electrode 122 in the row adjacent thereto serves as a touch sensing electrode.

Figure 3:
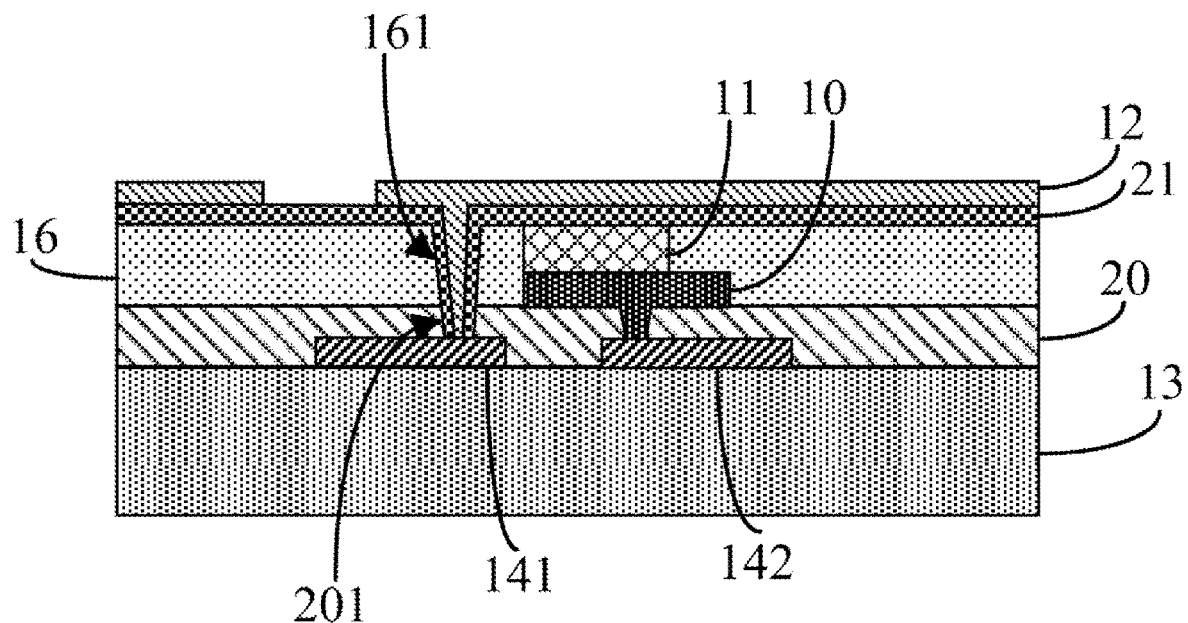
FIG. 3 is a schematic structural diagram of a connection between a cathode layer and a touch driving signal metal layer according to an embodiment of the present application.

Referring to FIG. 3, which is a schematic structural diagram of a connection between a cathode layer and a touch driving signal metal layer according to an embodiment of the present application. For ease of understanding and brief description, the same reference numerals are used for the same structures in this embodiment as in the above-described embodiment.

In some embodiments, the display panel comprises an array substrate 13, a planarization layer 20, and a common electrode layer 21. The planarization layer 20 is disposed between the array substrate 13 and the anode layer 10 and covers the metal layer 14. The planarization layer 20 may be the second planarization layer 15 in the embodiment as shown in FIG. 1. The pixel definition layer 16 is disposed on the planarization layer 20, wherein the anode layer 10 and the light-emitting functional layer 11 are disposed in the pixel definition layer 16. The common electrode layer 21 is disposed between the cathode layer 10 and the pixel definition layer 16. The planarization layer 20 is formed with a first opening 201 at a position corresponding to the touch driving signal metal layer 141, and the pixel definition layer 16 is formed with a second opening 161 at a position corresponding to the touch driving signal metal layer 141, and the first opening 201 and the second opening 161 are in communication. The touch driving signal metal layer 141 is exposed at the bottom of the first opening 201, and a cathode layer 12 (actually the first sub-electrode) is connected to the touch driving signal metal layer 141 at the bottom of the first opening 201.

Specifically, the common electrode layer 21 at the bottom of the cathode layer 12 in the first opening 201 may be removed by laser etching, so that the cathode layer 12 formed can overlap with the touch driving signal metal layer 141 at the bottom of the first opening 201.

Figure 4:
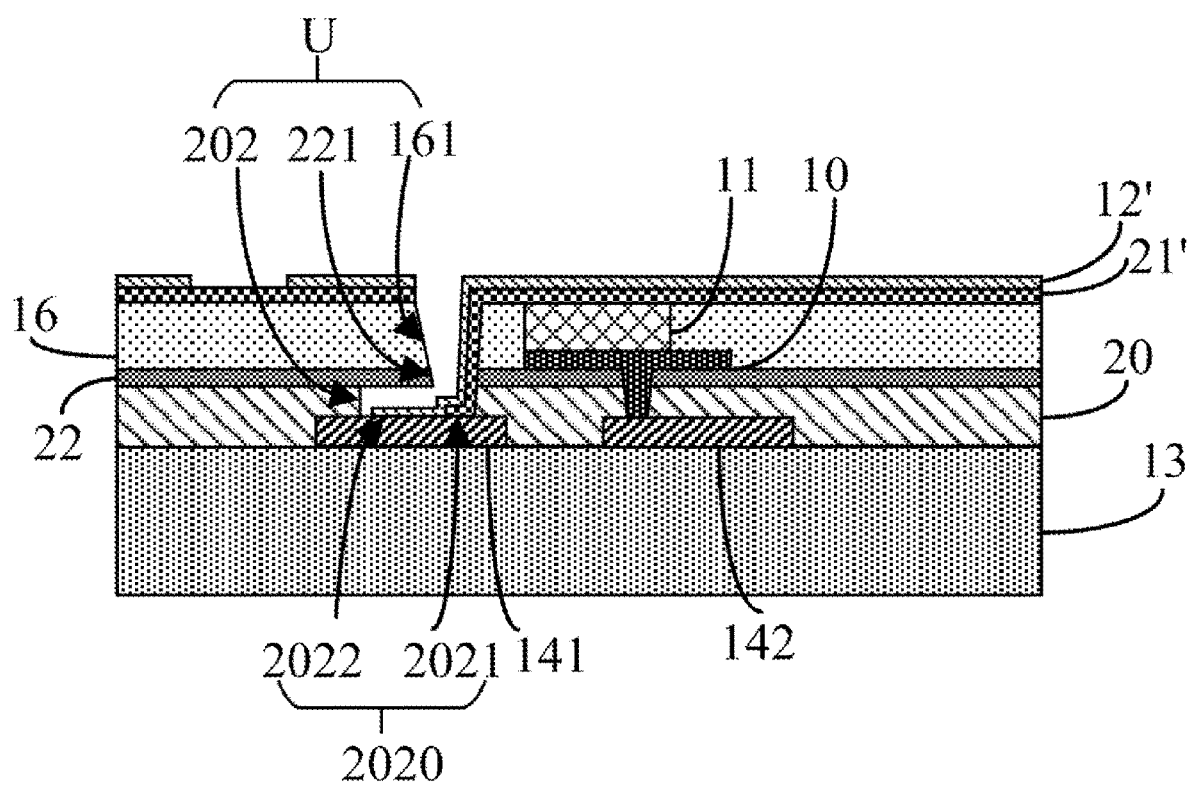
FIG. 4 is a schematic structural diagram of a connection between a cathode layer and a touch driving signal metal layer according to another embodiment of the present application.

Referring to FIG. 4, which is a schematic structural diagram of a connection between a cathode layer and a touch driving signal metal layer according to another embodiment of the present application. For ease of understanding and brief description, the same reference numerals are used for the same structures in this embodiment as in the above-described embodiment.

In some embodiments, the display panel may further comprise a passivation layer 22 disposed between the pixel defining layer 16 and the planarization layer 20. The planarization layer 20 is formed with a first opening 202 at a position corresponding to the touch driving signal metal layer 141. The pixel definition layer 16 is formed with a second opening 161 at a position corresponding to the touch driving signal metal layer 141. The passivation layer 22 is formed with a third opening 221 communicating the first opening 202 and the second opening 161. The touch driving signal metal layer 141 is exposed at the bottom 2020 of the first opening 202. A material of the passivation layer 22 may be an inorganic material.

The first opening 202, the second opening 161, and the third opening 221 may form an undercut structure U—that is, an area of the first opening 202 in a cross-section parallel to the array substrate 13 is larger than that of the third opening 221 in a cross-section parallel to the array substrate 13 and that of the second opening 161 in a cross-section parallel to the array substrate 13. Specifically, the undercut structure U may be formed by dry etching—that is, the pixel definition layer 16 and the passivation layer 22 are less etched, and the planarization layer 20 is more etched. The bottom 2020 of the first opening 202 includes a first bottom portion 2021 and a second bottom portion 2022, wherein the first bottom portion 2021 is exposed to the second opening 161 and the third opening 221, and the second bottom portion 2022 is shielded by the passivation layer 22 and the pixel definition layer 16.

In some embodiments, after the undercut structure U is formed, shadows of evaporation of the cathode layer 12' and the common electrode layer 21' may be adjusted such that a shadow of evaporation of the cathode layer 12' is larger than a shadow of evaporation of the common electrode layer 21', so as to allow the common electrode layer 21' to cover the first bottom 2022. Thus, the cathode layer 12' can cover the second bottom 2022 of the first opening 202 that is not covered by the common electrode layer 21', so that the cathode layer 12' (actually the first sub-electrode) is connected to the touch driving signal metal layer 141 at the bottom 2020 of the first opening 202.

In this embodiment, the common electrode layer 21' and the cathode layer 12' are also formed on the right side wall of the undercut structure U. The display panel may also comprise an encapsulation layer (not shown), which is formed on the cathode layer 12' and filled in the undercut structure U.

The display panel provided in embodiments of the present application comprises an anode layer 10, a light-emitting functional layer 11, and a cathode layer 12/12', wherein the light-emitting functional layer 11 is disposed on the anode layer 10, and the cathode layer 12/12' is disposed on the light-emitting functional layer 11 and comprises a plurality of cathode units 120. Each of the cathode units 120 comprises a first electrode 121 and a second electrode 122 that are insulated from each other, wherein the second electrode 122 is disposed at a periphery of the first electrode 121. In the present application, the cathode layer 12/12' is divided into a plurality of cathode units 120, and the first electrode 121 and the second electrode 122 may form a mutual-capacitive in-cell touch electrode, there is no need to add other film layers and equipments. Therefore, structure of the in-cell touch display panel can be simplified and the cost can be saved.

Embodiments of the present application further provide a display device comprising at least the display panel in any one of the above-described embodiments, thereby having the same beneficial effect as that of any one of the above-described display panels, and the repeated description is omitted here.

The description of the aforesaid embodiments is only used to help understand the technical solution of the present application and the core idea thereof. A person skilled in the art shall understand that it is still possible to modify the technical solutions described in the above embodiments, or equivalently substitute some of the technical features thereof. However, these modifications or substitutions do not make the essence of the corresponding technical solutions depart from scopes of the technical solutions of each embodiment of the present application.

What is claimed is:

1. A display panel, wherein the display panel comprises at least:
  a metal layer comprising a touch driving signal metal layer;
  an anode layer;
  a light-emitting functional layer disposed on the anode layer; and
  a cathode layer disposed on the light-emitting functional layer, wherein the cathode layer comprises a plurality of cathode units, each of the cathode units comprises a first electrode and a second electrode that are insulated from each other, and in each of the cathode units, the first electrode is enclosed by the second electrode in a top view structure;
  wherein the first electrodes comprise a plurality of first sub-electrodes and a plurality of second sub-electrodes, the plurality of first sub-electrodes are electrically connected to the touch driving signal metal layer to be reused as touch sensing electrodes, and the plurality of second sub-electrodes are not electrically connected to the touch driving signal metal layer.

2. The display panel according to claim 1, wherein the display panel further comprises:
  an array substrate comprising a source and a drain; and
  wherein the metal layer is disposed between the array substrate and the anode layer, and the metal layer further comprises a connecting metal layer arranged spaced apart from the touch driving signal metal layer, and the connecting metal layer connects the anode and the drain.

3. The display panel according to claim 2, wherein the plurality of cathode units are distributed in a plurality of rows, the cathode units in two adjacent rows are staggered, and the second electrodes in a same row are connected to each other.

4. The display panel according to claim 3, wherein a plurality of rows of the first electrodes comprise connecting row electrodes and virtual row electrodes that are alternately arranged, the connecting row electrodes comprise at least one of the plurality of first sub-electrodes and the plurality of second sub-electrodes, and the virtual row electrodes comprise the plurality of second sub-electrodes.

5. The display panel according to claim 4, wherein the connecting row electrodes comprise the plurality of the first sub-electrodes, and the plurality of the first sub-electrodes and the plurality of second sub-electrodes are alternately arranged in a row of the connecting row electrode.

6. The display panel according to claim 4, wherein among the connecting row electrodes of different rows, the first sub-electrodes are distributed in columns, and the touch driving signal metal layer extends along a column direction of the first sub-electrodes.

7. The display panel according to claim 4, wherein the first sub-electrode in the connecting row electrode and the second electrode in the same row form a touch electrode.

8. The display panel according to claim 4, wherein the first sub-electrode in the connecting row electrode and the second electrode in the adjacent virtual row electrode form a touch electrode.

9. The display panel according to claim 2, wherein the display panel further comprises:
  a planarization layer disposed between the array substrate and the anode layer and covering the metal layer;
  a pixel definition layer disposed on the planarization layer, wherein the anode layer and the light-emitting functional layer are disposed in the pixel definition layer;
  a common electrode layer disposed between the cathode layer and the pixel definition layer;
  wherein the planarization layer and the pixel definition layer are respectively formed with a first opening and a second opening in communication at positions corresponding to the touch driving signal metal layer, and the first electrode is connected to the touch driving signal metal layer at a bottom of the first opening.

10. The display panel according to claim 9, wherein the display panel further comprises:
  a passivation layer disposed between the pixel defining layer and the planarization layer, wherein the passivation layer is formed with a third opening communicating the first opening and the second opening;
  wherein the bottom of the first opening comprises a first bottom exposed to the second opening and the third opening, and a second bottom shielded by the passivation layer and the pixel definition layer, the common electrode layer covers the first bottom, and the first electrode covers the common electrode layer and the second bottom.

11. A display device, wherein the display device comprises at least the display panel of claim 1.

12. The display device according to claim 11, wherein the display panel further comprises:
  an array substrate comprising a source and a drain; and
  wherein the metal layer is disposed between the array substrate and the anode layer, and the metal layer further comprises a connecting metal layer arranged spaced apart from the touch driving signal metal layer, and the connecting metal layer connects the anode and the drain.

13. The display device according to claim 12, wherein the plurality of cathode units are distributed in a plurality of rows, the cathode units in two adjacent rows are staggered, and the second electrodes in a same row are connected to each other.

14. The display device according to claim 13, wherein a plurality of rows of the first electrodes comprise connecting row electrodes and virtual row electrodes that are alternately arranged, the connecting row electrodes comprise at least one of the plurality of first sub-electrodes and the plurality of second sub-electrodes, and the virtual row electrodes comprise the plurality of second sub-electrodes.

15. The display device according to claim 14, wherein the connecting row electrodes comprise the plurality of the first sub-electrodes, and the plurality of the first sub-electrodes and the plurality of second sub-electrodes are alternately arranged in a row of the connecting row electrode.

16. The display device according to claim 14, wherein among the connecting row electrodes of different rows, the first sub-electrodes are distributed in columns, and the touch driving signal metal layer extends along a column direction of the first sub-electrodes.

17. The display device according to claim 14, wherein the first sub-electrode in the connecting row electrode and the second electrode in the same row form a touch electrode.

18. The display device according to claim 14, wherein the first sub-electrode in the connecting row electrode and the second electrode in the adjacent virtual row electrode form a touch electrode.

19. The display device according to claim 12, wherein the display panel further comprises:
   a planarization layer disposed between the array substrate and the anode layer and covering the metal layer;
   a pixel definition layer disposed on the planarization layer, wherein the anode layer and the light-emitting functional layer are disposed in the pixel definition layer;
   a common electrode layer disposed between the cathode layer and the pixel definition layer;
   wherein the planarization layer and the pixel definition layer are respectively formed with a first opening and a second opening in communication at positions corresponding to the touch driving signal metal layer, and the first electrode is connected to the touch driving signal metal layer at a bottom of the first opening.

20. The display device according to claim 19, wherein the display panel further comprises:
   a passivation layer disposed between the pixel defining layer and the planarization layer, wherein the passivation layer is formed with a third opening communicating the first opening and the second opening;
   wherein the bottom of the first opening comprises a first bottom exposed to the second opening and the third opening, and a second bottom shielded by the passivation layer and the pixel definition layer, the common electrode layer covers the first bottom, and the first electrode covers the common electrode layer and the second bottom.

* * * * *